3,357,788
PROCESS FOR PRODUCING FINELY DIVIDED CALCIUM FLUORIDE HAVING CONTROLLED PARTICLE SIZE
John Franklin Ross, Shaker Heights, Ohio, assignor to General Electric Company, a corporation of New York
No Drawing. Filed May 24, 1965, Ser. No. 458,425
3 Claims. (Cl. 23—88)

ABSTRACT OF THE DISCLOSURE

A process for producing fluoride crystals, particularly calcium fluoride having readily controllable particle size which is about the same as that of the calcium carbonate from which it is produced. Intimate admixtures of calcium carbonate with an ammonium fluoride react at elevated temperatures in a dry condition to produce such calcium fluoride crystals.

---

This invention relates to a process for the manufacture of metal fluorides having controlled particle sizes. More particularly, the invention relates to such a process for producing pure metal fluorides in a dry condition so that further purification or drying are unnecessary for general application of the material.

It is generally desirable to have available a process for producing metal fluorides with controlled particle size. Thus, expensive steps of grinding, sifting and air classifying could be avoided. Although the prior art provides methods for producing certain compounds such as metal carbonates with controllable particle size, previously known methods for producing metal fluorides having controlled particle sizes involve expenses that could desirably be avoided in commercial process if possible.

In prior art wet manufacturing procedures, one of the problems has been that of causing fluoride crystals to develop from extremely fine particles to particles of desirable sizes such as about one micron average diameter so that the material can be washed with conventional equipment. In the wet manufacture of calcium fluoride, this has required large volumes of solutions to be held at their boiling temperatures for several hours.

Calcium fluoride is especially useful in the production of calcium halophosphate phosphors, as described in Patent 2,653,857, Ross et al., and Patent 2,488,733, McKeag et al., both assigned to the assignee of the present invention.

Accordingly, it is an object of the present invention to provide a process for the production of metal fluorides having controllable particle size that is new and provides potential cost savings over the processes of the prior art.

Another object of the invention is to provide such a process that does not require further purification or drying of the product for general application.

Still another object of the invention is to provide such a process for the production of calcium fluoride specially suited for use in the production of lamp phosphors.

Further objects and advantages of the invention appear from the following detailed description of species thereof.

Briefly stated, the present invention provides, in one aspect, a process for producing metal fluorides comprising the steps of forming a finely divided intimate admixture of a carbonate of the metal and an ammonium fluoride, adjusting the temperature of the admixture to initiate a reaction between the constituents of the admixture resulting in carbon dioxide and ammonia being given off and leaving as a product the desired metal fluoride having a particle size about that of the metal carbonate provided in the admixture. Either ammonium bifluoride ($NH_4HF_2$) or ammonium fluoride ($NH_4F$), or mixtures of the two can be used as the ammonium fluoride.

In the production of calcium fluoride, it has been found under certain conditions that the reaction of $CaCO_3$ with $NH_4HF_2$ to form $CaF_2$ goes to completion in about 1.75 hours at 150° C. and in about five minutes at 400° C. With $NH_4F$, the reaction goes to completion in about two hours at 150° C. and in about ten minutes at 400° C. From a production standpoint, it is preferable to use about 5 to 10 mole percent excess metal compound over the amount required for stoichiometric reaction with the ammonium fluoride to avoid any residual ammonium fluoride due to inaccuracies in proportioning. Residual calcium carbonate would not be harmful and, indeed, would be useful in lamp phosphor production using calcium fluoride made according to the present invention.

The reaction is operable with metals that form metal fluorides generally, provided carbonates of the metal can be provided which decompose on heating to the metal and carbon dioxide. Specifically, I have found the reaction to be useful in the production of cadmium fluoride, zinc fluoride, barium fluoride, strontium fluoride, lithium fluoride and magnesium fluoride. In each case, the fluoride product of the reaction had a particle size approximately the same as that of the metal carbonate provided to the admixture. This unusual phenomenon might be referred to as a "memory" of the fluoride crystals for the size of their predecessor metal compound crystals. Although the mechanism is not definitely known, the reaction might take place by diffusion of fluorine atoms into the metal carbonate particles in conjunction with the removal of carbon and oxygen from the metal carbonate particles. Since this is essentially a dry process not requiring any aqueous phase, the resultant product is dry and free flowing, containing no apparent water, and it is also as free from impurities as are the starting materials.

Calcium carbonate is commercially available with a high purity and having particle sizes desirable for the production of calcium halophosphate phosphors. The present invention permits the production of calcium fluoride from such calcium carbonate so that the fluoride crystals have approximately the same desirable high purities and particle sizes as did the carbonate crystals.

The present invention is used in the production of calcium fluoride with ammonium bifluoride according to the reaction:

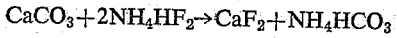

with volatiles resulting as follows:

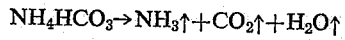

When ammonium fluoride is used, the initial reaction is as follows:

Analogous reactions occur in the production of fluorides of other metals.

Example I.—Calcium fluoride

A series of experiments will now be described in which coarse calcium carbonate having an average particle size of about 8 microns was reacted with $NH_4HF_2$ and $NH_4F$. Approximately one-tenth mole quantities were used, e.g., 10.0 grams calcium carbonate with 5.8 grams ammonium bifluoride or 7.5 grams of ammonium fluoride. The fluorides were crushed with a mortar and pestle, and calcium carbonate was admixed with the fluoride. The admixtures were placed in platinum dishes forming layers about one-half inch deep, and the dishes were heated for various times at several temperatures. The table below presents the time required for various degrees of completion of the reaction as determined by weight loss and X-ray diffraction tests at certain stated temperatures.

CACO₃ REACTION TO FORM CAF₂ PERCENT OF COMPLETION—AT VARIOUS TIMES

| Temp. (° C.) | NH₄HF₂ | | NH₄F | |
|---|---|---|---|---|
| | Percent | Hours | Percent | Hours |
| 100 | 86 | 18.5 | 90 | 18.5 |
| 125 | 93 | 4 | 96 | 4 |
| 150 | 100 | 1.75 | 100 | 2 |
| 175 | 100 | 1 | 100 | 1.5 |
| 200 | 100 | 0.75 | 100 | 1 |
| 250 | 100 | 0.5 | 100 | 0.5 |
| 400 | 100 | (¹) 5 | 100 | ¹ 10 |

¹ Minutes.

Similar experiments were also conducted with fine calcium carbonate having an average particle size of about 0.5 micron. In each case, the resulting fluoride crystals had particle sizes approximately the same as those of the calcium carbonate crystals used.

Examples of successful formulae for the preparation of other fluorides by the above procedure using stoichiometric proportions, in 0.1 mole quantities, follow:

*Example II.—Cadmium fluoride*

| | Grams |
|---|---|
| Cadmium carbonate $CdCO_3$ | 18.0 |
| Ammonium bifluoride $NH_4HF_2$ | 5.8 |

*Example III.—Zinc fluoride*

| | |
|---|---|
| Zinc carbonate $ZnCO_3$ | 12.5 |
| Ammonium bifluoride $NH_4HF_2$ | 5.8 |

*Example IV.—Barium fluoride*

| | |
|---|---|
| Barium carbonate $BaCO_3$ | 20.0 |
| Ammonium bifluoride $NH_4HF_2$ | 5.8 |

*Example V.—Strontium fluoride*

| | |
|---|---|
| Strontium carbonate $SrCO_3$ | 14.8 |
| Ammonium bifluoride $NH_4HF_2$ | 5.8 |

*Example VI.—Lithium fluoride*

| | |
|---|---|
| Lithium carbonate $Li_2CO_3$ | 7.4 |
| Ammonium bifluoride $NH_4HF_2$ | 5.8 |

*Example VII.—Magnesium fluoride*

| | |
|---|---|
| Magnesium carbonate $4MgCO_3 \cdot Mg(OH)_2 \cdot 4H_2O$ | 9.3 |
| Ammonium bifluoride $NH_4HF_2$ | 5.8 |

Thus, it has been demonstrated that the method of the present invention is useful for providing metal fluorides, and in particular calcium fluoride having characteristics which make it dsirable for use in the production of calcium halophosphate lamp phosphors.

While specific examples have been given of the process of the present invention, it will be understood that various changes, omissions and substitutions may be made within the true spirit and scope of the invention as defined in the appended claims.

What I claim as new and desire to secure by Letters Patent of the United States is:

1. A process for producing finely divided calcium fluoride useful in the manufacture of phosphors and having controlled particle size which comprises forming a finely divided intimate admixture of calcium carbonate with an ammonium fluoride, adjusting the temperature of said admixture to initiate a reaction between said calcium carbonate and said ammonium fluoride so that ammonia and carbon dioxide gases are given off leaving as a reaction product the desired fluoride in a finely divided particulate form having about the same particle size as the calcium carbonate provided in the admixture.

2. The process of claim 1 in which the ammonium fluoride is $NH_4F$, and in which the reaction is conducted at a temperature about between 150° C. and 400° C. for a period of time about from ten minutes to two hours sufficient to cause the reaction to go essentially to completion.

3. The process of claim 1 in which the ammonium fluoride is $NH_4HF_2$, and in which the reaction is conducted at a temperature about between 150° C. and 400° C. for a period of time about from five minutes to 1.75 hours sufficient to cause the reaction to go essentially to completion.

References Cited

UNITED STATES PATENTS

| 1,911,004 | 5/1933 | Svendsen | 23—88 |
| 2,800,389 | 7/1957 | Mockrin | 23—88 |
| 2,972,515 | 2/1961 | Mockrin | 23—88 |

OTHER REFERENCES

Jacobsen's "Encyclopedia of Chemical Reactions," 1948 edition, volume 2, page 57, Reinhold Publishing Corp., New York.

OSCAR R. VERTIZ, *Primary Examiner.*

E. STERN, *Assistant Examiner.*